S. SCOGNAMILLO.
WHEEL.
APPLICATION FILED NOV. 3, 1911.
1,094,259.
Patented Apr. 21, 1914.
2 SHEETS—SHEET 1.
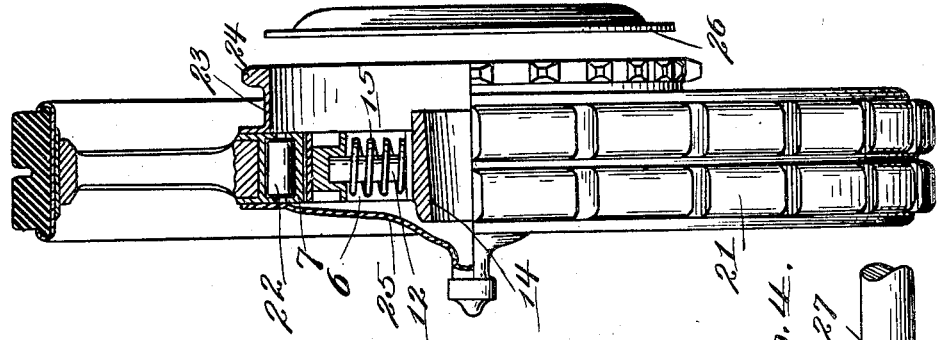
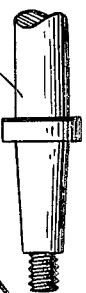
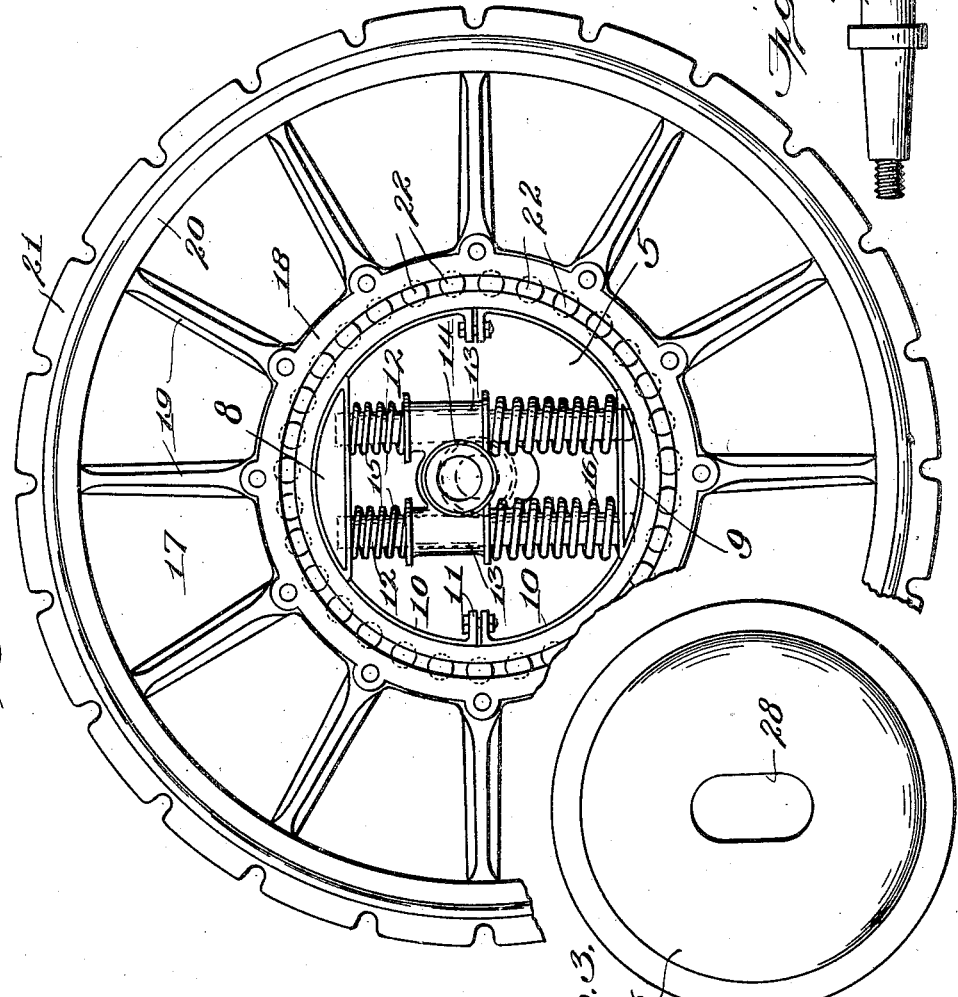
Witnesses:
Chas. S. Hyer.
Inventor
Salvatore Scognamillo
James L. Dorris Jr.
Atty

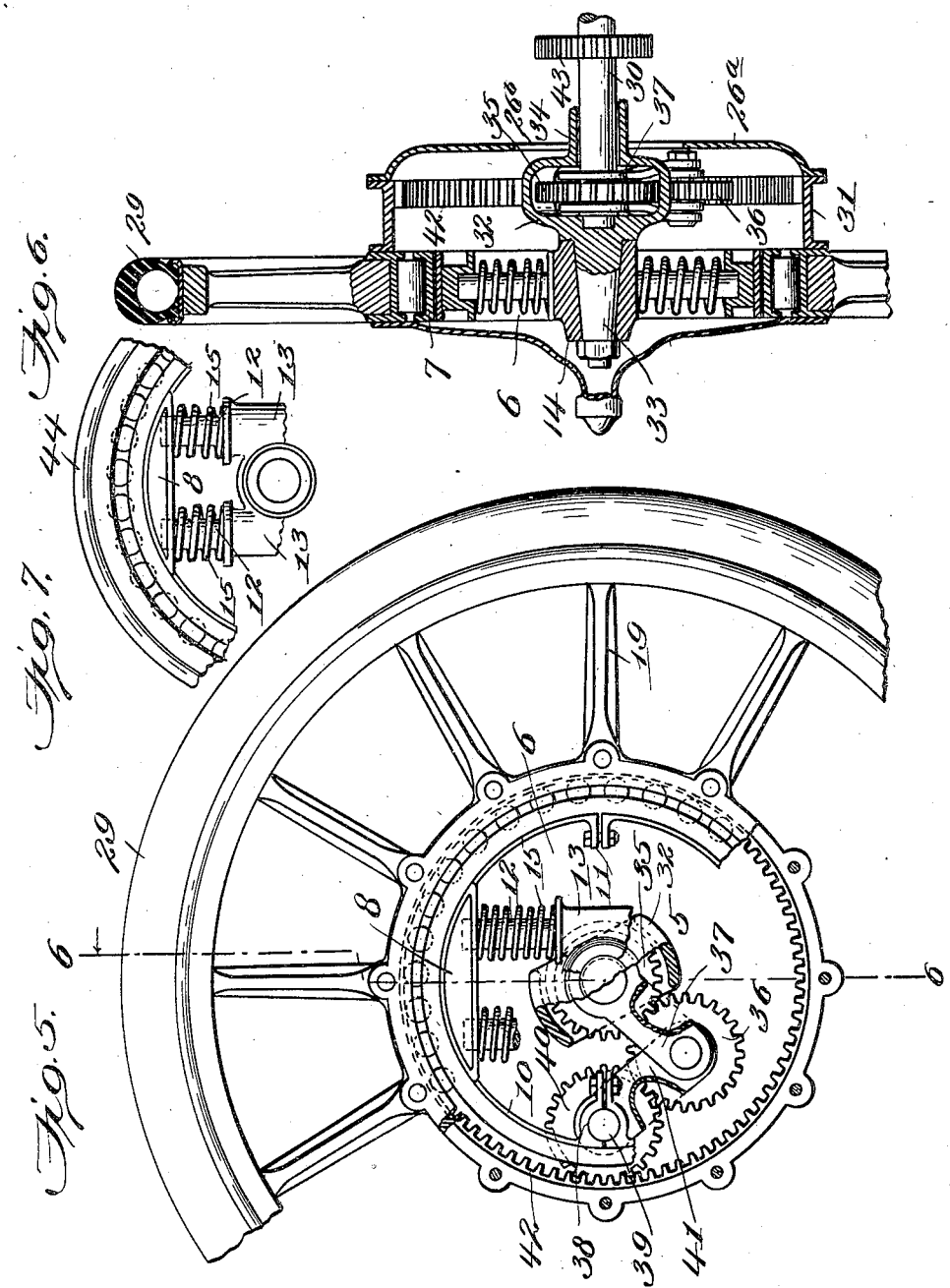

UNITED STATES PATENT OFFICE.

SALVATORE SCOGNAMILLO, OF NEW YORK, N. Y.

WHEEL.

1,094,259.　　　　　　　Specification of Letters Patent.　　Patented Apr. 21, 1914.

Application filed November 3, 1911. Serial No. 658,421.

*To all whom it may concern:*

Be it known that I, SALVATORE SCOGNAMILLO, a citizen of the United States, residing at New York, in the county of New York and State of New York, have invented new and useful Improvements in Wheels, of which the following is a specification.

This invention relates to wheels for vehicles such as motor trucks, automobiles, cars and other classes where the wheel may be applicable or where it is desirable to obviate as nearly as possible all shocks or jars due to obstructions in the path of the wheel.

To this end the invention consists in a wheel hub organization or an inner wheel unit having a non-rotatable association with an axle or axle inclosing means and provided with a particular form of spring cushion wholly carried by the said hub organization or inner wheel unit and with the latter movable vertically or wherein the axle or axle support is resiliently held to compensate for inequalities in the surface over which the wheel travels, and an outer wheel rim organization freely rotatable around the hub organization or inner wheel unit, antifrictional devices being interposed between the two parts of the wheel.

The invention further consists in the construction and arrangement of the several parts which will be more fully hereinafter described and claimed.

In the drawings: Figure 1 is a side elevation of a wheel partially broken away and embodying the features of the invention. Fig. 2 is an edge elevation, partially in section, of the improved wheel. Figs. 3 and 4 are detail views of parts of the wheel. Fig. 5 is an elevation of a portion of the wheel broken away and shown in section in parts and adapted for use on automobiles and provided with means for directly driving the same. Fig. 6 is a transverse vertical section on the line 6—6, Fig. 5. Fig. 7 is a detail elevation of a portion of the wheel shown arranged for use on railroad cars.

The numeral 5 designates an inner wheel unit or organization which comprises a circular body 6 with an outer circumferentially grooved rim 7, upper and lower supporting members 8 and 9 provided with sectional or segmental bands or rings 10 which are connected when applied as at 11 in alinement with the horizontal diameter of the wheel, and between the supporting members 8 and 9 are two rods 12 spaced apart and having their ends fitted in the said members. The rods 12 are vertically disposed, and freely movable thereon are opposite sleeves 13 secured to or formed with an axle engaging member 14 interposed between them and between the upper and lower ends of the sleeves and the members 8 and 9 are springs 15 and 16 which surround the rods 12, the springs 15 being shorter and lighter than the springs 16 for a purpose which will be more fully hereinafter explained. The segmental bands or rings 10 and the rim 7 are snugly associated to provide a fixed wheel center or unit, so far as rotation is concerned; and coöperating with the said center or the unit 5 is an outer wheel section or organization 17 which, as shown by Figs. 1 and 2, comprises an inner circumferentially channeled or grooved rim 18, a series of spokes 19, an outer tread rim 20, and a solid tire 21, this particular form of the wheel being adapted for use on trucks and heavy vehicles. Between the rims 7 and 18 antifrictional rollers 22 are mounted so that the outer wheel section or organization 17 as just explained may freely and sensitively rotate around the inner wheel organization or unit 5. In the wheel shown by Figs. 1 and 2 a cylinder or shell 23 is secured to the inner side of the rim 18, as shown by Fig. 2, and has an inner sprocket rim 24 to receive a chain belt for indirectly driving the wheel organization or section 17 relatively to the inner wheel organization or unit 5. Over the outer portion of the wheel and secured to the rim 18 is a covering disk or closure 25 of the form shown by Fig. 2, and against the sprocket rim 24 a dished cover or closure 26 is secured, the said latter cover being shown in detail by Fig. 3. The member 14 is engaged by the outer end of a fixed axle 27, as shown by Fig. 4, said axle extending through a vertical slot 28 in the dished cover or closure 26, as shown by Fig. 3, so that the wheel as an entirety may move vertically with relation to the axle.

In the construction of the wheel shown by Figs. 5 and 6 the same general organization is adopted as just explained with the exception of the shell 23 and its sprocket rim 24, the wheel shown by Figs. 5 and 6 being adapted for direct drive, and, furthermore, the outer wheel organization is provided in this instance with a cushion tire of any suitable form as at 29. The form of wheel shown by Figs. 5 and 6 is adapted for use on automobiles and analogous vehicles wherein there is a direct drive from a shaft or axle 30 to which rotative movement is imparted, and power transmitting mechanism is provided and will now be explained. To the rear portion of the rim 18 a cylindrical casing 31 is secured, provided with an inclosing cover 26ª and a central opening 26ᵇ for movement therein of the axle and support which will be more fully hereinafter explained. Within the inclosure formed by the cylindrical casing 31 and the cover 26ª a gear shell or guard 32 is mounted and has a projection 33 extending through the member 14, said projection being constructed in all respects similar to an axle journal or skein, and the member 14 is secured thereon by any of the well known methods. The drive axle 30, which has a rotative movement imparted thereto, extends into the shell 32 and is supported by a tubular inclosure or fixed axle member 34 which is secured to or forms a part of the shell 32. Fixed on the end of the drive axle 30 within the shell 32 is a pinion 35 which is held in continual mesh with an intermediate pinion 36 supported by a bracket 37 extending downwardly from the end of the axle 30; and in a suitable bearing 38 formed at the joint of the bands or rings 10 at one side is a stub shaft 39 carrying a pinion 40, a bracket 41 also extending from the stub shaft 39 and coöperating with the bracket 37 to sustain the pinion 36 in positively supported position and in continual mesh with the two pinions 35 and 40 to serve as an intermediate power transmitting means. The pinion 40 is held in continual mesh with an annular gear or gear rim 42 secured to the inner side of the cylindrical casing 31, and by this means the motion of the drive axle 30 is transmitted to the outer wheel organization to drive the latter around the center wheel organization or unit, the said axle 30 being provided with the usual differential gears, one of which is shown by Fig. 6, as at 43. Fig. 7 shows the same structure embodied in a wheel for railroad cars, and therein the outer portion of the wheel is in the form of a flanged rim 44.

In all the forms of the wheel the springs 15 will have less resistance than the springs 16, and primarily the sleeves 13 with the member 14 between them will be located above the horizontal diameter of the central organization or wheel unit 5, and when the weight of the body of the vehicle is imposed on the wheels the member 14 and sleeves will move down to the center, the springs 16 being constructed to normally sustain the body weight, and have the member 14 centrally disposed as just explained and also to compensate for maximum load weights. As the wheel travels over street, road or track, all shocks and jars are taken up by the springs 15 and 16, and the sleeves 13 being free to move on the rods or guides 12 will result in a resumption of the parts to normal position when obstructions have been passed with an easy movement or without jolt. The front wheels of a vehicle, such as trucks, automobiles and the like, will embody the essential features of the wheel hereinbefore described, the sprocket rim or driving gears being omitted.

The improved wheel is inclosed at the center and materially shielded from dust and dirt, is strong and durable in its service as well as beneficial in reducing wear on vehicles, and may be manufactured at a comparatively small expense. Changes in the proportions, dimensions and structural details may also be adopted without departing from the spirit of the invention.

What is claimed is:

In a wheel, the combination of a central organization comprising a circular body with an outer grooved rim and upper and lower members having vertically disposed rods terminally held in fixed spaced relation therein and extending across the said body on opposite sides of the center thereof, an axle engaging member having vertically disposed sleeves fixed to diametrically opposite portions thereof and slidably engaging the said rods, independent pairs of springs engaging the rods above and below and bearing upon the opposite ends of the sleeves, the lower pair of springs being of materially stronger tension than the upper pair of springs and normally disposing the axle engaging member above the center of the central organization, an outer wheel organization rotatably mounted on the said central organization, and antifrictional devices interposed between the central and outer wheel organizations.

In testimony whereof I have hereunto set my hand in presence of two subscribing witnesses.

SALVATORE SCOGNAMILLO.

Witnesses:
 CHAS. S. HYER,
 W. B. KEEFER.